(12) United States Patent
McGriff

(10) Patent No.: US 7,370,844 B2
(45) Date of Patent: May 13, 2008

(54) UNIVERSAL UTILITY TRAILER TILTER

(76) Inventor: Michael Platt McGriff, P.O. Box 776, Tijeras, NM (US) 87059

( * ) Notice: Subject to any disclaimer, the term of this patent is extended or adjusted under 35 U.S.C. 154(b) by 27 days.

(21) Appl. No.: 11/251,508

(22) Filed: Oct. 17, 2005

(65) Prior Publication Data
US 2006/0244239 A1    Nov. 2, 2006

(51) Int. Cl.
*B60S 9/02* (2006.01)
(52) U.S. Cl. ............ 254/420; 254/419; 254/418; 280/507; 280/475
(58) Field of Classification Search ........ 254/418–425, 254/133 R, 134; 280/507, 485
See application file for complete search history.

(56) References Cited
U.S. PATENT DOCUMENTS

| | | | | |
|---|---|---|---|---|
| 5,184,840 A * | 2/1993 | Edwards | ............... | 280/507 |
| 5,379,987 A * | 1/1995 | Cleary | ............... | 254/134 |
| 5,695,204 A * | 12/1997 | Ford | ............... | 280/507 |
| 5,878,995 A * | 3/1999 | Rundle | ............... | 254/133 R |
| 6,145,813 A * | 11/2000 | Anderson | ............... | 254/418 |
| 6,213,491 B1 * | 4/2001 | Southard, Jr. | ............... | 280/475 |
| 6,302,381 B1 * | 10/2001 | Roll | ............... | 254/425 |
| 6,361,023 B1 * | 3/2002 | Peavler | ............... | 254/424 |
| 6,478,325 B1 * | 11/2002 | Knauff | ............... | 280/507 |

* cited by examiner

*Primary Examiner*—Lee D Wilson

(57) ABSTRACT

The "Universal Utility Trailer" Tilter is designed to be portable and lightweight. This will enable the user to insert it into a standard 2" receiver hitch on a tow vehicle. Upon attaching the Trailer Tilter to the vehicle the operator can attach any one of a number of Utility Trailers to the Trailer Tilters 2" ball. By removing the locking pin and operating the mechanism the operator can raise the front of the Utility Trailer thus lowering the rear to a desired level for loading equipment, cars or material. The lowering of the rear of the Utility Trailer until the ramps are level with the bed will prevent the equipment from dragging on either the front or middle while loading. Once loaded the operator can lower the Tilter back to its locking position and insert the locking pin for towing.

4 Claims, 1 Drawing Sheet

Fig # 1

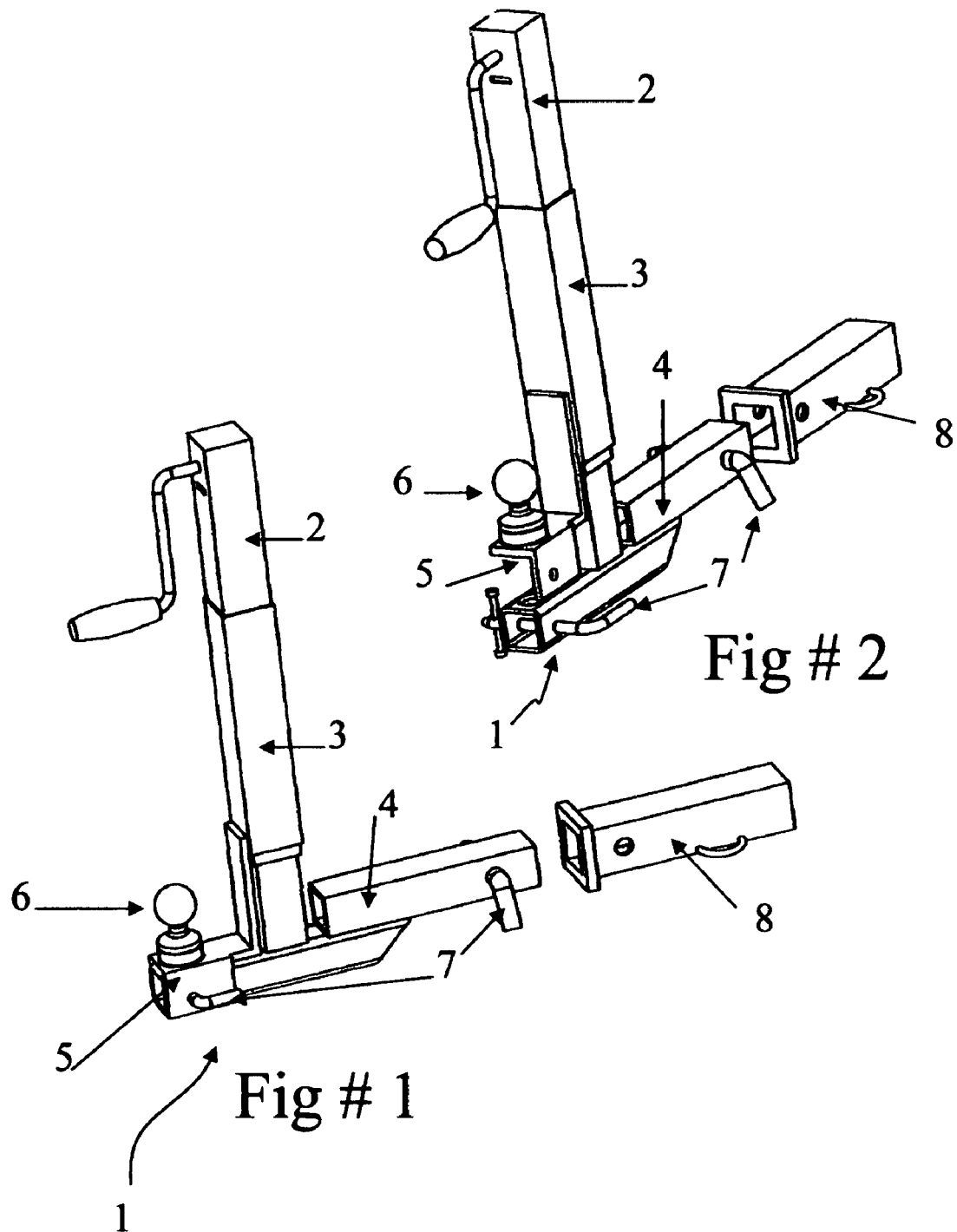
Fig # 1
Fig # 2

UNIVERSAL UTILITY TRAILER TILTER

CROSS-REFERENCE TO RELATED APPLICATION

<NONE>

FIELD OF THE INVENTION

The present invention relates generally to jack systems for utility Trailer tilters and more particularly a system combining a jack and a hitch.

BACKGROUND OF INVENTION

Utility type trailers are in wide spread use today in this country and around the world. Individuals use the trailers for multiple proposes, from loading and moving automobiles and equipment to furniture. Utility trailer come with a jack permanently installed in the tongue area. This jack is used not only to help attach the trailer to the tow vehicle but also to raise it to assist in loading equipment. Using the trailer jack to raise the trailer while attached to the tow vehicle creates and unsafe condition as it also raises the rear of the tow vehicle and puts unnecessary strain on the jack. The Universal Utility Trailer Tilter when installed into the receiver hitch on the towing vehicle allows the individual, by removing the safety pin and turning the handle on the jack to raise the ball mount to the desired height, will lower the rear of the trailer without effecting the tow vehicle. Once the vehicle or other equipment is safely loaded onto the trailer, the jack returned to the lowered position and safety pin reinstalled, the trailer can be towed to its destination. Loading of these items is made much easier and safer with this unit.

SUMMARY OF INVENTION

The Universal Utility Trailer Tilter is a unit easily installed into the 2" receiver hitch on any towing vehicle. Once installed and the safety pin inserted the receiver hitch on the tow vehicle the Tilter is ready to receive any selected utility trailer. Attach and secure the selected utility trailer to the Tilter prior to loading any vehicle or equipment. To utilize the Tilter for its intended purpose the operator will first need to remove the safety pin below the ball installed on the mount. Once the pin has been removed this will allow the operator turn the handle on the attached jack to raise the ball and front of the trailer to the height required to safely load and unload vehicles and equipment. Lowering the rear of the trailer allows a more even approach to the trailer deck preventing dragging and damage to the underneath of the unit being loaded.

DETAILED DESCRIPTION OF THE DRAWINGS FIGURES

FIG. 1 shows the present invention.

FIG. 2 shows the present invention in use, partially up position.

DETAILED DESCRIPTION OF THE PREFERRED EMBODIMENTS

The Universal Utility Trailer Tilter is a solid and portable unit easily installed into the 2" receiver hitch on any towing vehicle. Once installed in the receiver 8 and safety pin 7 secured the Tilter is ready to receive any selected utility trailer. After the selected trailer is attached to a ball hitch 6 on the tilter and secured it will be ready for the individual to utilize the tilter for its designed purpose. By removing the safety pin 7 directly below the ball hitch 6 and turning the handle on the jack, this will allow the Tilter to be free and rise to the desired height for loading. Once loaded it can be lowered back to its towing position and secured with the safety pin 7.

FIG. 1 illustrates the embodiment of the Universal Utility Trailer Tilter. A base mount is primarily made up of two parts which is a rear part 1 and forward part 4, the rear part of the base mount 1 and the forward part of the base mount 4 is attached to the upper part of the rear base mount 1. The forward part of the base mount 4 becomes an upper frame mount 4 which is used to insert into the receiver hitch 8 on the tow vehicle. The rear part of the base mount 1 has the jack 2 being welded to the upper part of the base mount 1 becoming a jack support 1 The jack 2 is than reinforced to hold the ball hitch with a ball mount 5 having two pieces of angle iron welded into an L-shape with a bottom and side with an aperture for a safety pin. The ball mount 5 is than welded to the angle shape connected to a rectangular member which both comprise element 3 as shown in the drawings of the jack 2. Once this is completed the jack 2 is than welded to the base mount 1 to complete the unit. Holes are drilled in Mounts 1 and 4 to accommodate the safety pins 7 and a ball hitch 6 of a selected size is installed.

The receiver hitch 8 is attached to a tow vehicle, normally below the rear bumper and is not shown in full detail. FIG. 1, prior to attaching a selected utility trailer, the upper frame mount 4 will be inserted into the receiver hitch 8 attached to the tow vehicle. To accomplish this remove the safety pin 7 located on upper frame mount 4. Insert the upper frame mount 4, horizontally, into the receiver hitch 8. Insert the safety pin 7 thru the receiver hitch 8 and the Upper frame mount 4 to secure the unit FIG. 2 as shown is in the partial up position. The jack 2 has been rotated enough to raise the ball mount 5 off the jack support 1. To accomplish raising the ball 6 vertically, the safety pin 7 located below the ball mount 5 has to be removed. A hole the size of the safety pin 7 has been drilled thru the ball mount 5 and the jack mount 1 to allow the pin to hold the ball mount 5 in place for safety. Once the pin 7 has been removed rotate the handle on the jack 1 to raise the ball mount 5 and ball 6 vertically to a desired height. To return the ball mount 5 and ball 6 to its original position on top of the jack support 1, rotate the handle of jack 2 in the opposite direction. The ball mount 5 and ball hitch 6 will return vertically to the jack support 1, a hole the size of a nut has been cut into the top of the jack support 1 to let the ball mount 5 rest directly on the Jack Mount 1. Reinsert the safety pin 7 back thru the ball mount 5 and jack support 1 to secure the unit for towing.

While the present invention has been described with reference to certain preferred embodiments, one of ordinary skill in the art will recognize that additions, deletions, substitutions, modifications, and improvements can be made while remaining within the spirit and scope of the present inventions as defined by the appended claims.

What is claimed is:

1. A utility trailer tilter assembly for raising a tongue of a utility trailer said utility trailer tilter comprising:
   - a jack including a handle and an attached angle plate;
   - a hitch attached to said angle plate;
   - a base mount having a rear part and forward part and;
   - wherein said jack is attached to said rear part and said forward part is attached to said rear part and said forward part is detachably connected with a vehicle receiver hitch.

2. The utility trailer tilter assembly according to claim 1 wherein said base mount with said forward part having a safety pin.

3. The utility trailer tilter assembly according to claim 1 wherein said base mount with said rear part having a safety pin.

4. The utility trailer tilter assembly according to claim 3 wherein said hitch is attached to a ball mount L-shaped plate with a bottom and side plate including an aperture for said safety pin.

* * * * *